(12) United States Patent
Jin

(10) Patent No.: US 12,031,226 B2
(45) Date of Patent: Jul. 9, 2024

(54) NICKEL PHOSPHOROUS COATING

(71) Applicant: Raytheon Technologies Corporation, Farmington, CT (US)

(72) Inventor: Lei Jin, Unionville, CT (US)

(73) Assignee: RTX Corporation, Farmington, CT (US)

( * ) Notice: Subject to any disclaimer, the term of this patent is extended or adjusted under 35 U.S.C. 154(b) by 124 days.

(21) Appl. No.: 17/831,677

(22) Filed: Jun. 3, 2022

(65) Prior Publication Data
US 2023/0392276 A1  Dec. 7, 2023

(51) Int. Cl.
| | |
|---|---|
| *F01D 5/28* | (2006.01) |
| *C25D 3/56* | (2006.01) |
| *C25D 5/00* | (2006.01) |
| *C25D 5/50* | (2006.01) |
| *C25D 7/00* | (2006.01) |
| *C25D 7/10* | (2006.01) |
| *F02C 7/06* | (2006.01) |
| *F02C 7/30* | (2006.01) |

(52) U.S. Cl.
CPC ............. *C25D 5/615* (2020.08); *C25D 3/562* (2013.01); *C25D 5/50* (2013.01); *C25D 7/00* (2013.01); *C25D 7/10* (2013.01); *F02C 7/06* (2013.01); *F02C 7/30* (2013.01); *F05D 2230/90* (2013.01)

(58) Field of Classification Search
CPC ...................................................... F01D 5/288
See application file for complete search history.

(56) References Cited

U.S. PATENT DOCUMENTS

| | | | |
|---|---|---|---|
| 7,828,526 B2 * | 11/2010 | Cairo | F04D 29/322 416/224 |
| 9,089,062 B2 | 7/2015 | Janssen | |
| 10,781,701 B2 | 9/2020 | Arai | |
| 11,225,876 B2 | 1/2022 | Jin et al. | |
| 2008/0124542 A1 | 5/2008 | Hanlon | |
| 2011/0206532 A1 * | 8/2011 | Sorbo | C23C 18/32 427/383.1 |
| 2016/0333493 A1 | 11/2016 | Miettinen et al. | |
| 2019/0017177 A1 * | 1/2019 | Gold | C23C 28/3215 |
| 2021/0254232 A1 * | 8/2021 | Jin | C23C 28/021 |
| 2021/0277511 A1 | 9/2021 | Liu et al. | |
| 2021/0285110 A1 | 9/2021 | Martel et al. | |
| 2021/0332482 A1 | 10/2021 | Hazel et al. | |

FOREIGN PATENT DOCUMENTS

| | | |
|---|---|---|
| CN | 109457220 | 3/2019 |
| EP | 3167100 | 2/2020 |
| EP | 3865604 | 8/2021 |

OTHER PUBLICATIONS

Partial European Search Report for European Patent Application No. 3177048.8 dated Oct. 5, 2023.

* cited by examiner

*Primary Examiner* — Michael L Sehn
(74) *Attorney, Agent, or Firm* — Carlson, Gaskey & Olds, P.C.

(57) ABSTRACT

An article for a gas turbine engine according to an exemplary embodiment of this disclosure, among other possible things includes a substrate and a nickel phosphorous coating disposed on the substrate. The nickel phosphorus coating has a columnar microstructure. A method of applying a coating to an article for a gas turbine engine is also disclosed.

10 Claims, 2 Drawing Sheets

NICKEL PHOSPHOROUS COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to articles, such as those used in gas turbine engines, and methods of coating such articles. Components, such as gas turbine engine components, may be subjected to high temperatures and elevated stress levels. In order to improve the thermal stability, the component may include a protective barrier coating.

SUMMARY

An article for a gas turbine engine according to an exemplary embodiment of this disclosure, among other possible things includes a substrate and a nickel phosphorous coating disposed on the substrate. The nickel phosphorus coating has a columnar microstructure.

In a further example of the foregoing, the columnar microstructure includes columns arranged approximately parallel to a plane of the substrate.

In a further example of any of the foregoing, the coating is between about 1 and 5 mils (25.4 to 127 microns) thick.

In a further example of any of the foregoing, the substrate comprises a titanium alloy, a nickel alloy, a steel alloy, or combinations thereof.

In a further example of any of the foregoing, the substrate comprises a titanium alloy.

In a further example of any of the foregoing, the coating has a hardness between about 750 and 1100 HV.

In a further example of any of the foregoing, the coating provides corrosion resistance to the substrate.

In a further example of any of the foregoing, the coating provides mechanical protection to the substrate.

In a further example of any of the foregoing, the article is a component of a bearing system of the gas turbine engine.

In a further example of any of the foregoing, the article is a component of a vane in a compressor or turbine of the gas turbine engine.

A method of applying a coating to an article for a gas turbine engine according to an exemplary embodiment of this disclosure, among other possible things includes electroplating nickel phosphorous onto the surface of an article to form a coating and heat treating the coated article after the electroplating. After the heat treating the nickel phosphorous has a columnar microstructure.

In a further example of the foregoing, the columnar microstructure includes columns arranged approximately parallel to a plane of the substrate.

In a further example of any of the foregoing, the coating is between about 1 and 5 mils (25.4 to 127 microns) thick after the heat treating.

In a further example of any of the foregoing, the article comprises a titanium alloy, a nickel alloy, a steel alloy, or combinations thereof.

In a further example of any of the foregoing, the article comprises a titanium alloy.

In a further example of any of the foregoing, the coating includes regions of pure nickel.

In a further example of any of the foregoing, the coating has a hardness between about 750 and 1100 HV after the heat treating.

In a further example of any of the foregoing, the coating provides thermal and mechanical protection to the substrate.

In a further example of any of the foregoing, the article is a component of a bearing system of the gas turbine engine.

In a further example of any of the foregoing, the article is a component of a vane in a compressor or turbine of the gas turbine engine.

DETAILED DESCRIPTION

Figure 1:
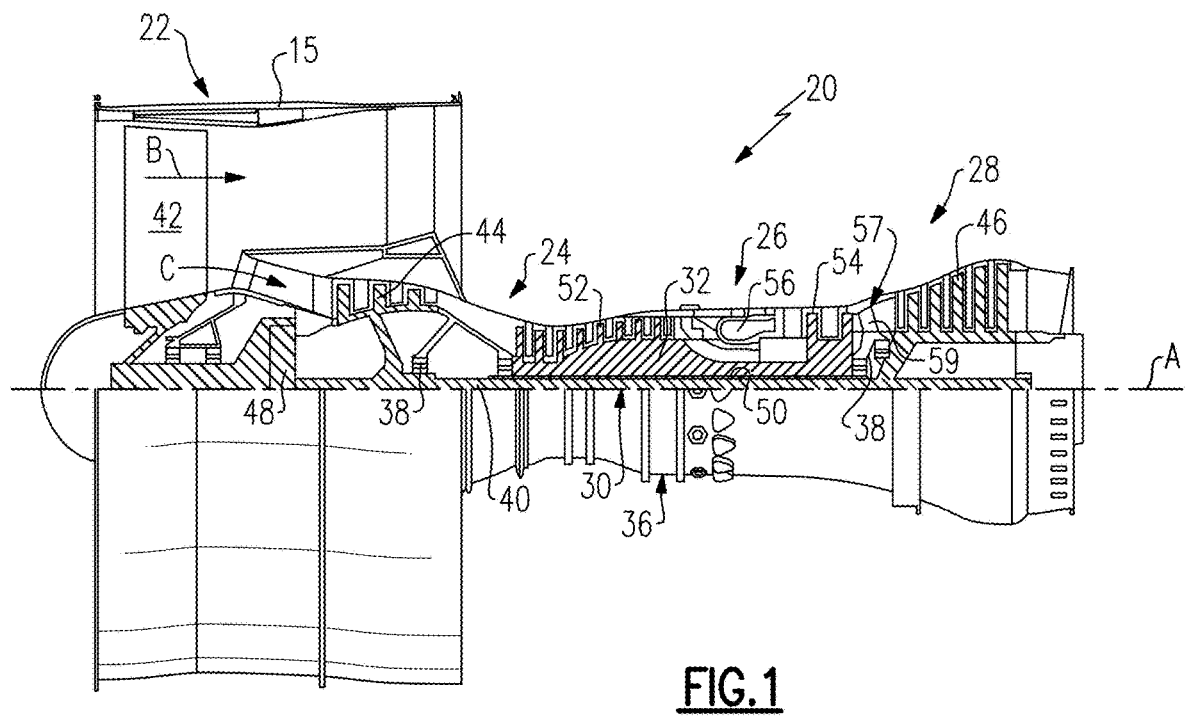
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Nickel phosphorous alloy provides good corrosion and mechanical protection to substrates. However, nickel phosphorous alloy is conventionally deposited by electroless plating methods, which results in a laminar grain structure. This laminar grain structure is known to have high tensile internal stress after heat treatment, which in turn applies stresses to the substrate on which the nickel phosphorous is deposited. This causes an article coated with conventional nickel phosphorus coatings to have high fatigue debit and decreases the service life of the article. For instance, nickel phosphorous alloy deposited by electroless plating on titanium alloys has a fatigue debit of up to 75%. The high internal stresses in the nickel phosphorous material also causes cracks to generate, which act as initiation sites for further cracking and reduces the cracking stress of the nickel phosphorus material as well as the substrate. Accordingly, because of the high strength requirements for gas turbine engine 20 components, nickel phosphorous coatings have had limited use.

However, it has been discovered that nickel phosphorous with columnar microstructure is suitable as a corrosion and wear protection coating for gas turbine engine 20 components. The columnar nickel phosphorous has higher ductility and lower internal stress than laminar nickel phosphorous. The columnar nickel phosphorous therefore improves the fatigue debit and wear resistance of the component on which it is applied as compared to laminar nickel phosphorous.

Figure 2:
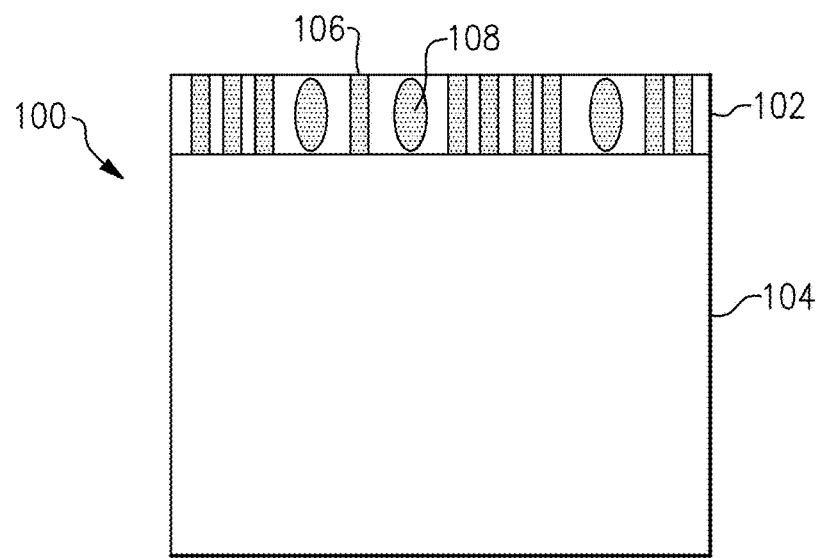
FIG. 2 schematically shows an article with a coating.

FIG. 2 schematically illustrates a representative portion of an example article 100 for the gas turbine engine 20 that includes a coating 102 disposed on a substrate 104. The coating 102 is a thermal barrier coating, e.g., it provides thermal protection to the article 100. The coating 102 also provides some mechanical protection to the substrate 104 as a result of its high hardness. The substrate 104 can comprise any metallic material, but in some particular examples comprises a titanium, steel, or nickel alloy, or combinations thereof.

The article 100 can be any component of the engine 20, but in some particular examples is a component exposed to high heat and stress, such as components of the bearing system 38 or the vane structures in the compressor section 24 or turbine section 28.

Figure 3B:
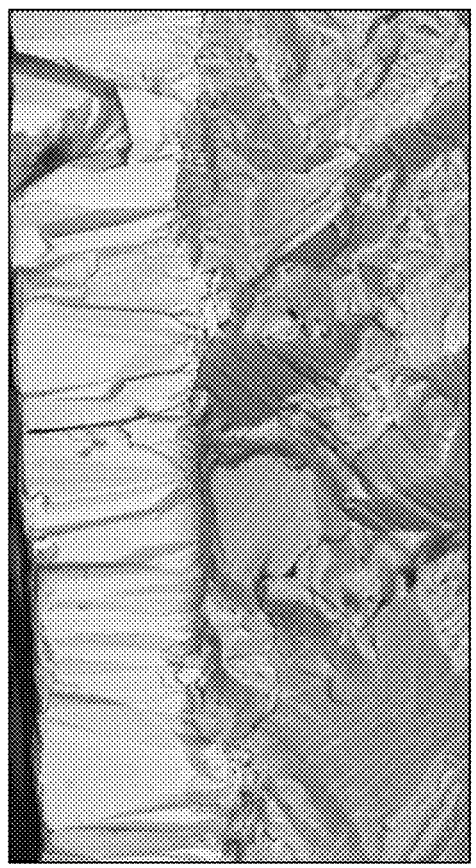
FIGS. 3*a-b* show the coating of FIG. 2 before and after heat treatment, respectively.
Figure 3A:
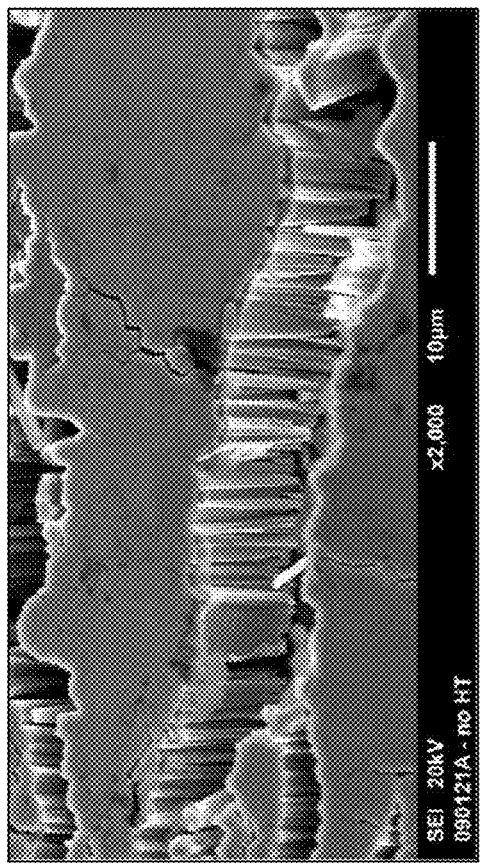

The coating 102 is a nickel phosphorus coating with columnar microstructure. The presence of columnar microstructure can be confirmed by Scanning Electron Microscope (SEM) analysis. FIGS. 3*a-b* show images of the columnar microstructure before and after heat treatment (discussed in more detail below). As shown, the columnar microstructure survives the heat treatment.

Referring again to FIG. 2, the columnar microstructure includes columns 106 oriented approximately perpendicular to a plane of the substrate 104.

The coating 102 has a high hardness to provide mechanical protection to the substrate 104. For instance, the hardness of the coating 102 is between about 750-1100 HV. For reference, conventional laminar nickel phosphorous coatings have hardness in the same range. However, the coating 102 has been determined to have residual stress after heat treatment that is about ⅓ of the residual stress of conventional laminar nickel phosphorus materials.

In some examples, the coating 102 has regions 108 of pure nickel.

The coating 102 is deposited by electroless plating methods as are known in the art. In general, electroless plating employs chemical reducers to reduce cations of a desired metal in solution and produce a metallic coating. The solution includes chemical additives that induce grain growth and encourages the formation of columns 106. Such additives are commercially available and known in the art.

After the electroless plating, the coating 102 is heat treated. For example, the heat treatment can be at 750 degrees F. (400 degrees C.) for 1 hour. As discussed above and shown in FIG. 3b, the columnar microstructure is retained after heat treatment. The heat treatment improves the temperature resistance and hardness of the coating 102.

In some examples, the coating is between about 1 and 5 mils (25.4 to 127 microns) thick.

As used herein, the terms "about" or "approximately" have the typical meaning in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article for a gas turbine engine, comprising:
a substrate, and
a nickel phosphorous coating disposed on the substrate, the nickel phosphorus coating having a columnar microstructure, wherein the coating includes at least one region of pure nickel interspersed with columns of the columnar microstructure.

2. The article of claim 1, wherein the columnar microstructure includes columns arranged approximately parallel to a plane of the substrate.

3. The article of claim 1, wherein the coating is between about 1 and 5 mils (25.4 to 127 microns) thick.

4. The article of claim 1, wherein the substrate comprises a titanium alloy, a nickel alloy, a steel alloy, or combinations thereof.

5. The article of claim 1, wherein the substrate comprises a titanium alloy.

6. The article of claim 1, wherein the coating has a hardness between about 750 and 1100 HV.

7. The article of claim 1, wherein the coating provides corrosion resistance to the substrate.

8. The article of claim 7, wherein the coating provides mechanical protection to the substrate.

9. The article of claim 1, wherein the article is a component of a bearing system of the gas turbine engine.

10. The article of claim 1, wherein the article is a component of a vane in a compressor or turbine of the gas turbine engine.

* * * * *